US009986116B2

United States Patent
Okazawa et al.

(10) Patent No.: US 9,986,116 B2
(45) Date of Patent: May 29, 2018

(54) IMAGE SCANNING APPARATUS

(71) Applicant: SEIKO EPSON CORPORATION, Tokyo (JP)

(72) Inventors: Yoshiyuki Okazawa, Shiojiri (JP); Kensuke Tamai, Shiojirl (JP); Hitoshi Igarashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/365,642

(22) Filed: Nov. 30, 2016

(65) Prior Publication Data
US 2017/0155782 A1 Jun. 1, 2017

(30) Foreign Application Priority Data
Dec. 1, 2015 (JP) .................................. 2015-234906

(51) Int. Cl.
G03G 15/00 (2006.01)
H04N 1/00 (2006.01)
E05D 11/00 (2006.01)
E05D 11/10 (2006.01)
E05F 1/12 (2006.01)

(52) U.S. Cl.
CPC ..... H04N 1/00554 (2013.01); E05D 11/0054 (2013.01); E05D 11/1028 (2013.01); E05D 11/1064 (2013.01); H04N 1/00557 (2013.01); E05F 1/1261 (2013.01); E05Y 2900/60 (2013.01); H04N 2201/0081 (2013.01)

(58) Field of Classification Search
CPC .................................................... H04N 1/0054
USPC .......................................................... 399/380
See application file for complete search history.

(56) References Cited

U.S. PATENT DOCUMENTS

| 5,483,880 | A | * | 1/1996 | Seo | ......................... | B41K 1/32 |
| | | | | | | 101/125 |
| 8,977,164 | B2 | * | 3/2015 | Hsiung | .............. | H04N 1/00551 |
| | | | | | | 399/125 |
| 9,203,995 | B2 | * | 12/2015 | Muraoka | ............ | H04N 1/00554 |
| 2004/0228082 | A1 | * | 11/2004 | Tiao | .................... | H04N 1/00519 |
| | | | | | | 361/679.27 |

(Continued)

FOREIGN PATENT DOCUMENTS

JP 2003-129739 A 5/2003
JP 2010-039027 A 2/2010
(Continued)

Primary Examiner — Anthony Nguyen
(74) Attorney, Agent, or Firm — Workman Nydegger

(57) ABSTRACT

An image scanning apparatus includes a document table that forms a document mounting surface, a cover body that covers and uncovers the document table, and a hinge mechanism which has an angle retainer that retains an opening angle of the cover body and which allows the cover body to be lifted up and down. The hinge mechanism includes a case that is inserted into an insertion portion provided in the document table so that the case is displaceable in lift up/down directions of the cover body. The case includes an arm portion which extends in a direction that includes a lift up/down direction component and which is elastically deformable in a direction that intersects the lift up/down directions. The arm portion elastically contacts a contact portion provided in the insertion portion so that the cover body is retained in position in the lift up/down directions.

7 Claims, 13 Drawing Sheets

(56) References Cited

U.S. PATENT DOCUMENTS

| | | | |
|---|---|---|---|
| 2005/0042006 A1* | 2/2005 | Qian | H04N 1/00519 399/380 |
| 2006/0215235 A1* | 9/2006 | Li | H04N 1/00519 358/474 |
| 2009/0274502 A1* | 11/2009 | Choi | H04N 1/00519 399/380 |
| 2011/0176124 A1* | 7/2011 | Takata | G03G 15/605 355/75 |

FOREIGN PATENT DOCUMENTS

| | | |
|---|---|---|
| JP | 2011-112967 A | 6/2011 |
| JP | 2013-020191 A | 1/2013 |
| WO | 2011065360 | 6/2011 |

* cited by examiner

IMAGE SCANNING APPARATUS

BACKGROUND

1. Technical Field

The present invention relates to an image scanning apparatus represented by a scanner and the like.

2. Related Art

Some image scanning apparatuses represented by a scanner or the like are equipped with a cover body that covers and uncovers a document table and pressingly holds a document when in a covering or closed state. This cover body is a simple cover in some image scanning apparatuses or is an automatic transport device for documents (auto document feeder (ADF)) in other image scanning apparatuses.

In any case, the cover body that covers and uncovers a document table is connected to a main apparatus body by a hinge mechanism that is generally called free stop hinge or the like in some scanning apparatus so that the cover body is pivotable relative to the document table and capable of being held at a predetermined pivot angle (opening angle) (e.g., JP-A-2003-129739 and JP-A-2011-112967). Furthermore, in some scanning apparatuses, the cover body is provided with a lift-up function for handling thick documents (e.g., a book) (e.g., JP-A-2013-020191 and JP-A-2010-039027).

There are demands that a predetermined lifted-up position be retainable, in addition to the realization of the free-stop function and the lift-up function. Meeting such demands will likely involve a complicated construction as in the Patent Document 3 and therefore remarkably increased cost and weight.

SUMMARY

An advantage of some aspects of the invention is that a hinge mechanism that has a simpler construction and therefore reduces the cost increase is provided.

One aspect of the invention provides an image scanning apparatus that includes a document table that forms a document mounting surface on which a document is mounted, a cover body that covers and uncovers the upper surface of the document table, and a hinge mechanism which has an angle retainer that retains an opening angle of the cover body and which allows the cover body to be lifted up and down relative to the document mounting surface. The hinge mechanism includes a case that has therein the angle retainer and that is inserted into an insertion portion provided in the document table so that the case is displaceable in lift up/down directions of the cover body. The case includes an arm portion which extends in a direction that includes a lift up/down direction component and which is elastically deformable in a direction that intersects the lift up/down directions. The arm portion elastically contacts a contact portion provided in the insertion portion so that the cover body is retained in position in the lift up/down directions.

According to this aspect of the invention, the hinge mechanism includes the case and the case is provided with the arm portion which extends in the direction that includes a lift up/down direction component and which is elastically deformable in the direction that intersects the lift up/down directions. Furthermore, the arm portion elastically contacts the contact portion provided in the insertion portion so that the position in the cover body in the lift up/down directions is retained. Therefore, a construction that retains the up/down position (lifted-up position) of the cover body (the case) can be obtained with a simple structure and at low costs.

In an embodiment of the foregoing image scanning apparatus of the invention, the arm portion may be provided with a rib formed in a direction that includes a lift up/down direction component and the rib may contact the contact portion so that the arm portion elastically deforms.

According to this embodiment, because the arm portion is provided with the rib formed in the direction that includes a lift up/down direction component and the rib contacts the contact portion so that the arm portion elastically deforms, adjusting the thickness of the rib will easily adjust the amount of elastic deformation of the arm portion and therefore will easily adjust the retention force for retaining the cover body (the case).

In another embodiment based on the foregoing embodiment of the image scanning apparatus of the invention, a distal end of the arm portion may be a free end, and a site on the arm portion which contacts the contact portion shifts toward the free end as the cover body is displaced in a lift-up direction and, furthermore, the rib may have such a shape that a thickness of the rib at the site that contacts the contact portion in a direction that intersects the lift up/down directions increases as the cover body is displaced in the lift-up direction.

As the cover body is displaced in the lift-up direction (lifted up), the site on the arm portion which contacts the contact portion shifts toward the free end of the arm portion, so that, in an ordinary construction, the elastic force that occurs when the arm portion is in elastic contact with the contact portion tends to become smaller and therefore the retention of the cover body in position tends to become difficult.

However, according to this embodiment, the rib has such a shape that the thickness of the rib at the site that contacts the contact portion in a direction that intersects the lift up/down directions increases as the cover body is displaced in the lift-up direction. Therefore, when the cover body is displaced in the lift-up direction, an amount of elastic deformation of the arm portion can be secured and, therefore, the cover body can be certainly retained in position.

Note that "such a shape that the thickness of the rib at the site that contacts the contact portion in a direction that intersects the lift up/down directions increases" does not necessarily refer only to such a shape that the thickness continuously increases but also includes, for example, such a shape that the thickness increases stepwise.

In still another embodiment of the invention based on any one of the foregoing constructions, the arm portion may be provided with a restriction portion that restricts the case from slipping out of the insertion portion.

According to this embodiment, because the arm portion is provided with the restriction portion that restricts the case from slipping out of the insertion portion, this construction prevents the unintentional detachment of the case and therefore of the cover body from the document table.

In yet another embodiment of the image scanning apparatus of the invention based on any one of the foregoing constructions, the cover body may cover and uncover the upper surface of the document table by pivoting about a pivot shaft, and the arm portion may be provided on a side portion of the case which faces in an axis direction of the pivot shaft.

According to this embodiment, because the cover body covers and uncovers the upper surface of the document table by pivoting about the pivot shaft, and the arm portion is provided on the side portion of the case which faces in the axis direction of the pivot shaft, the insertion portion provided at the side of the document table so as to accept insertion of the hinge mechanism can be substantially prevented from increasing in size in a direction that is orthogonal to the axis direction. As a result, the document table can be substantially prevented from increasing in size in the direction that is orthogonal to the axis direction.

In a further embodiment of the image scanning apparatus of the invention based on the foregoing embodiment, the arm portion may be provided on each of two opposite side portions of the case which face in axis directions of the pivot shaft.

According to this embodiment, because the arm portions are provided on the two opposite side portions of the case in the axis directions of the pivot shaft, this construction substantially prevents the arm portions from rotating relative to the insertion portion and therefore substantially prevents the cover body from becoming wobbly relative to the document table.

In a still further embodiment of the image scanning apparatus of the invention based on any one of the foregoing constructions, each arm portion may be formed from a resin material integrally with the case.

According to this embodiment, because each arm portion is formed from a resin material integrally with the case, the arm portion and the case can be provided at low costs.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
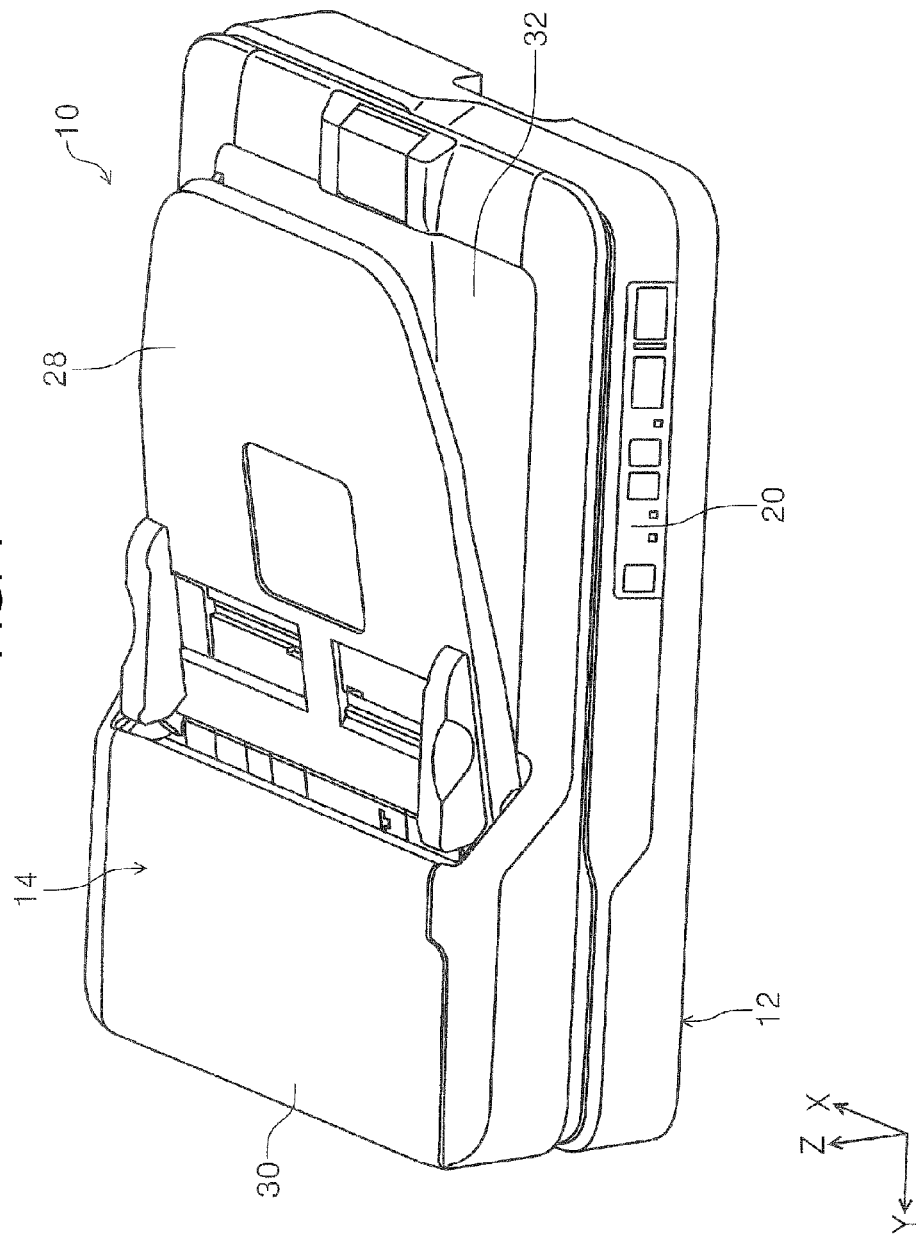
FIG. 1 is an external perspective view of an image scanning apparatus according to the invention.

Exemplary embodiments of the invention will be described hereinafter with reference to the drawings. Note that like constructions in the following exemplary embodiments are given like reference characters, each of such constructions will be described only in the description of an exemplary embodiment in which that construction is first mentioned and will not be described in the later descriptions of exemplary embodiments.

Figure 2:
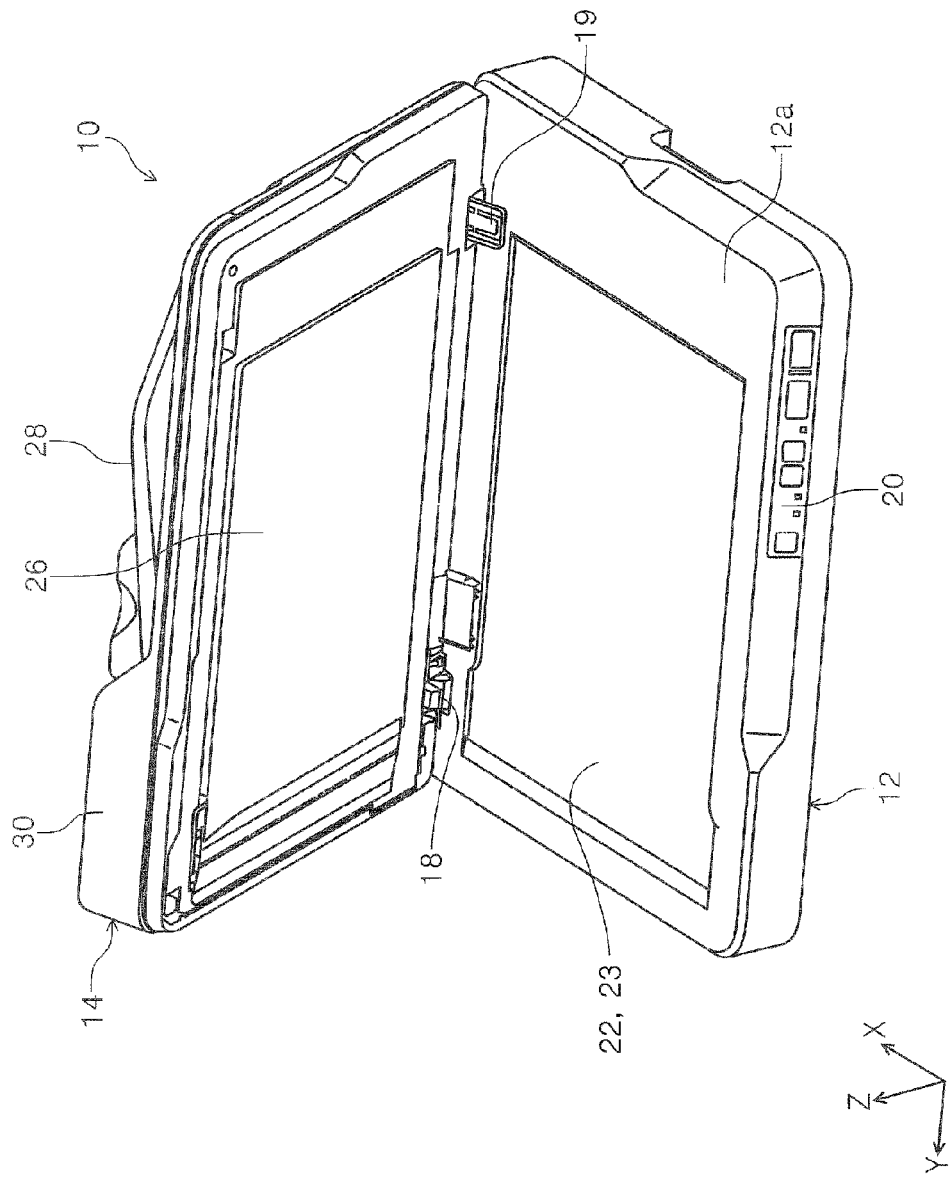
FIG. 2 is a front perspective view of the image scanning apparatus, with an ADF being in an open posture relative to a casing.
Figure 3:
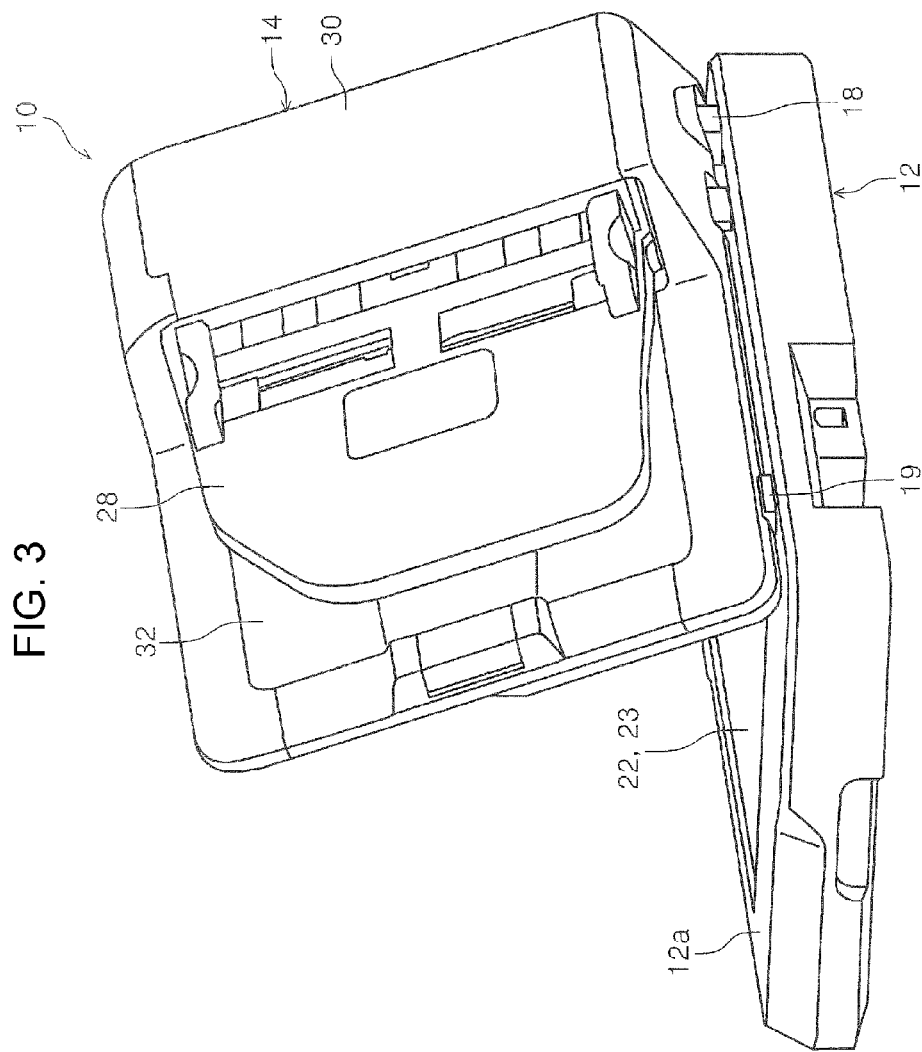
FIG. 3 is a rear perspective view of the image scanning apparatus, with the ADF being in an open posture relative to the casing.
Figure 4:
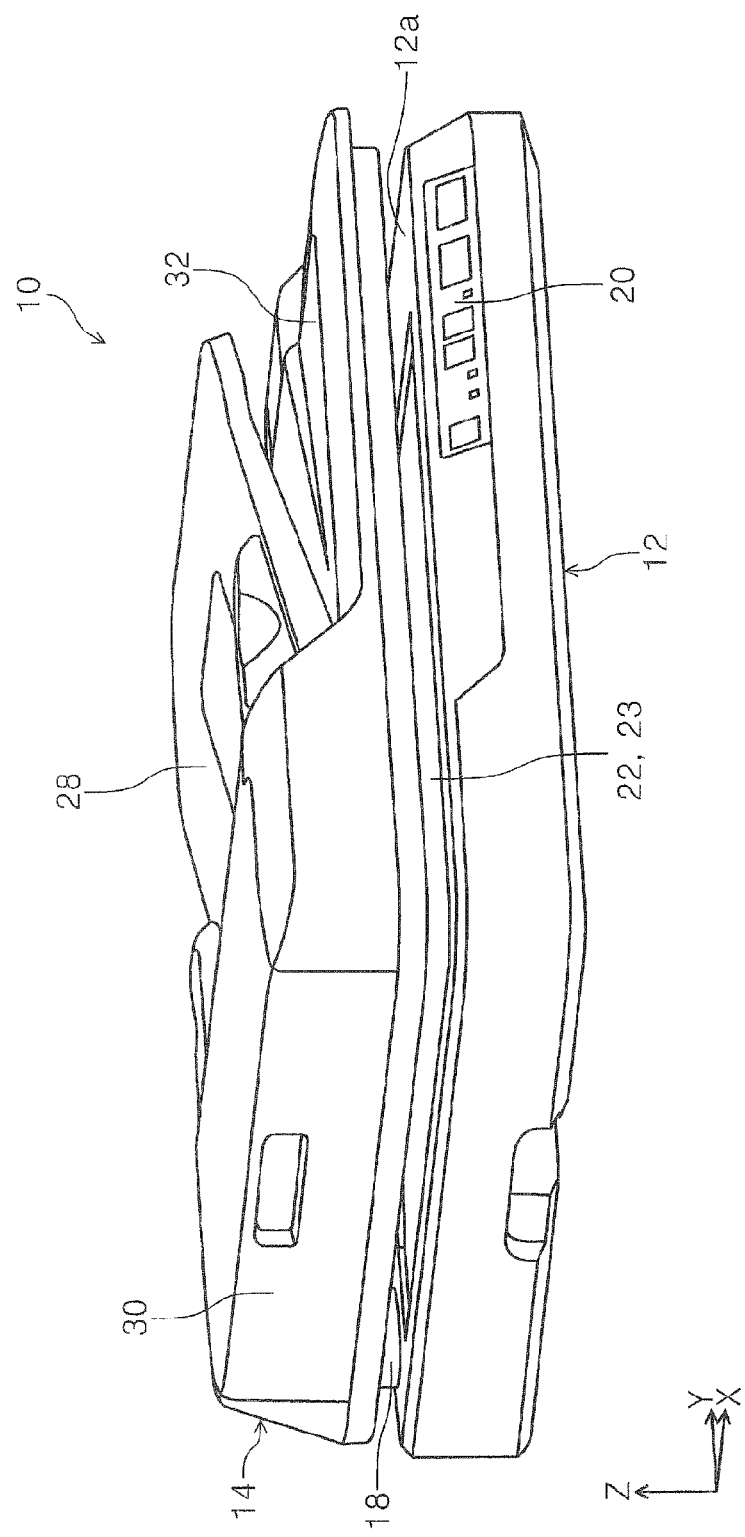
FIG. 4 is a perspective view of the image scanning apparatus, showing a state in which the ADF has been lifted up from the casing.
Figure 5:
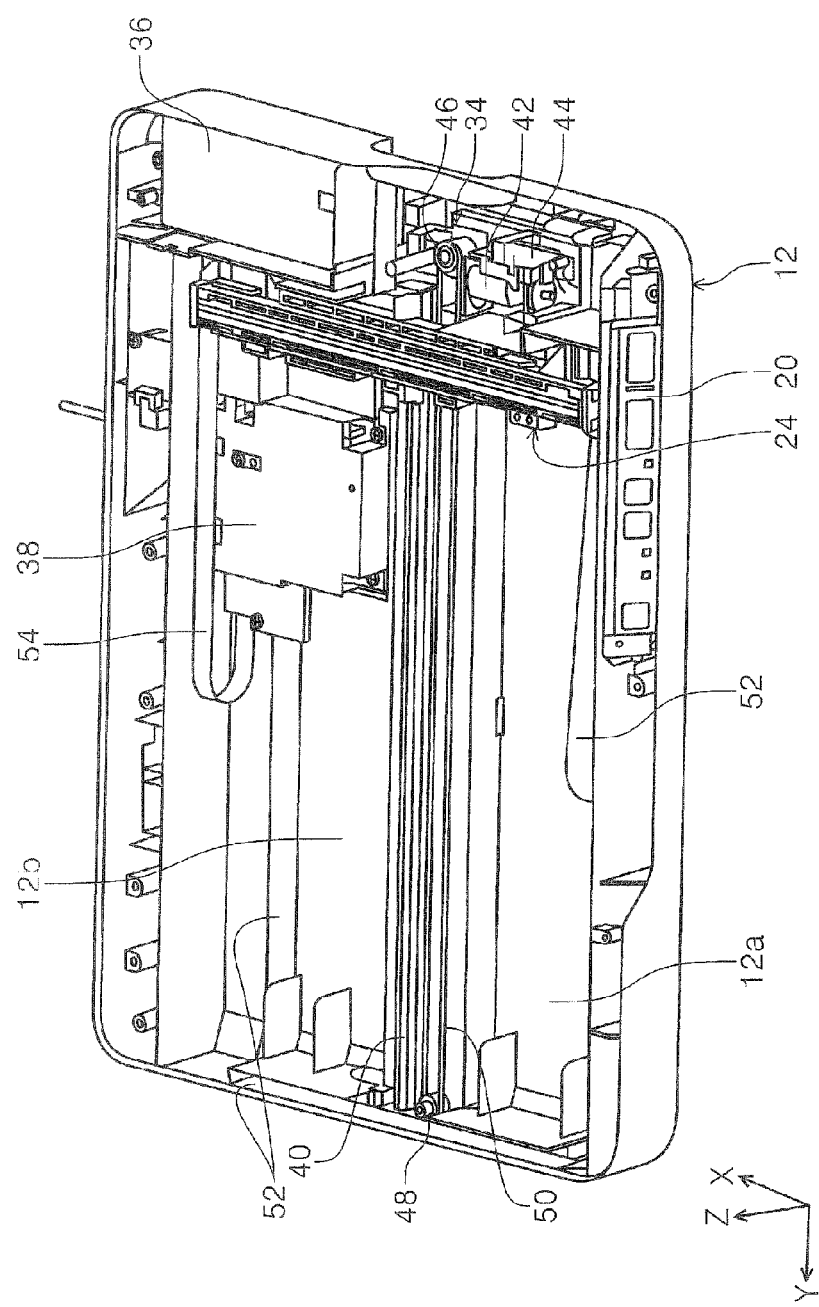
FIG. 5 is a perspective view showing an internal structure of the casing of the image scanning apparatus according to the invention.
Figure 6:
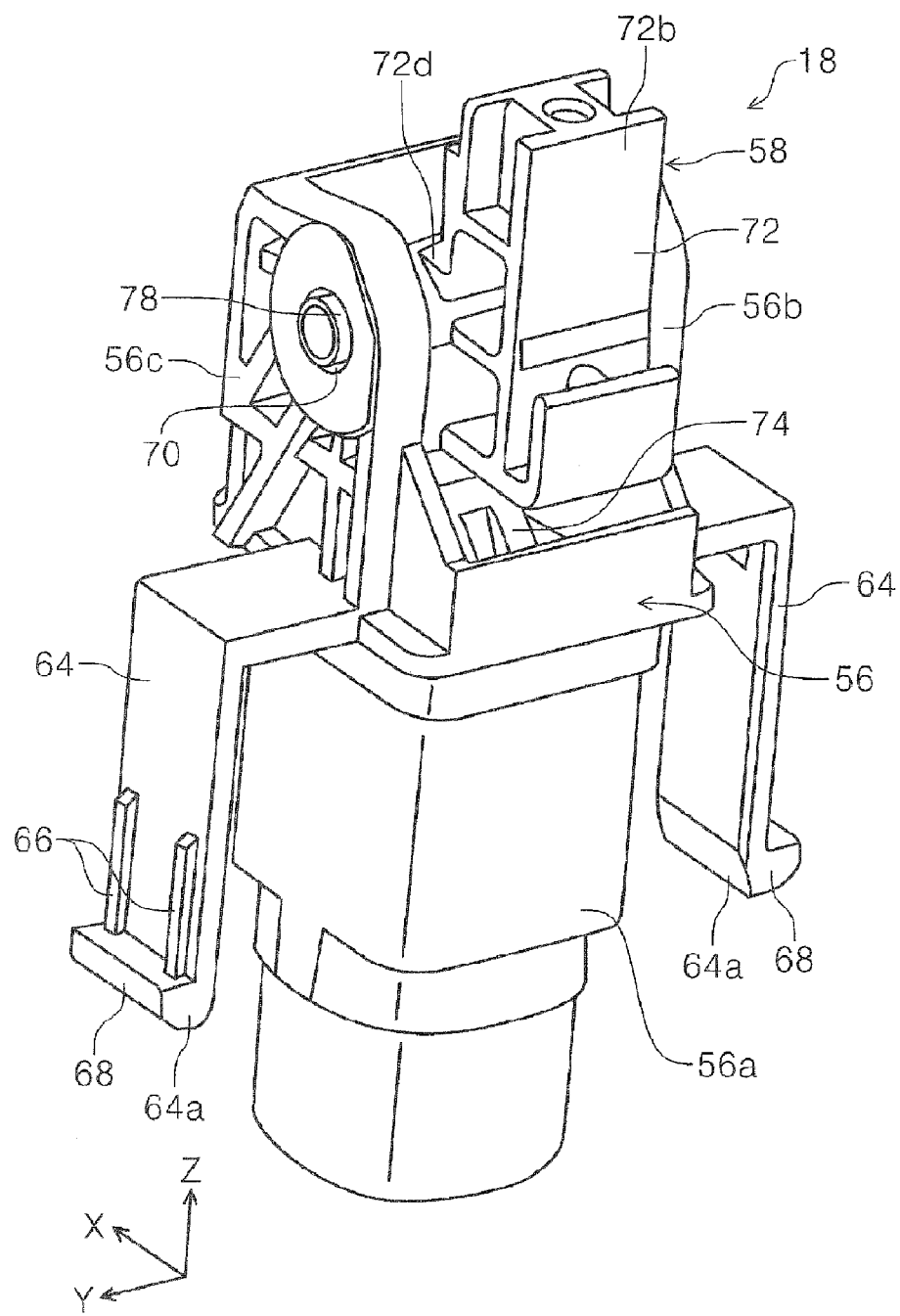
FIG. 6 is a perspective view showing a hinge unit according to the invention.
Figure 7:
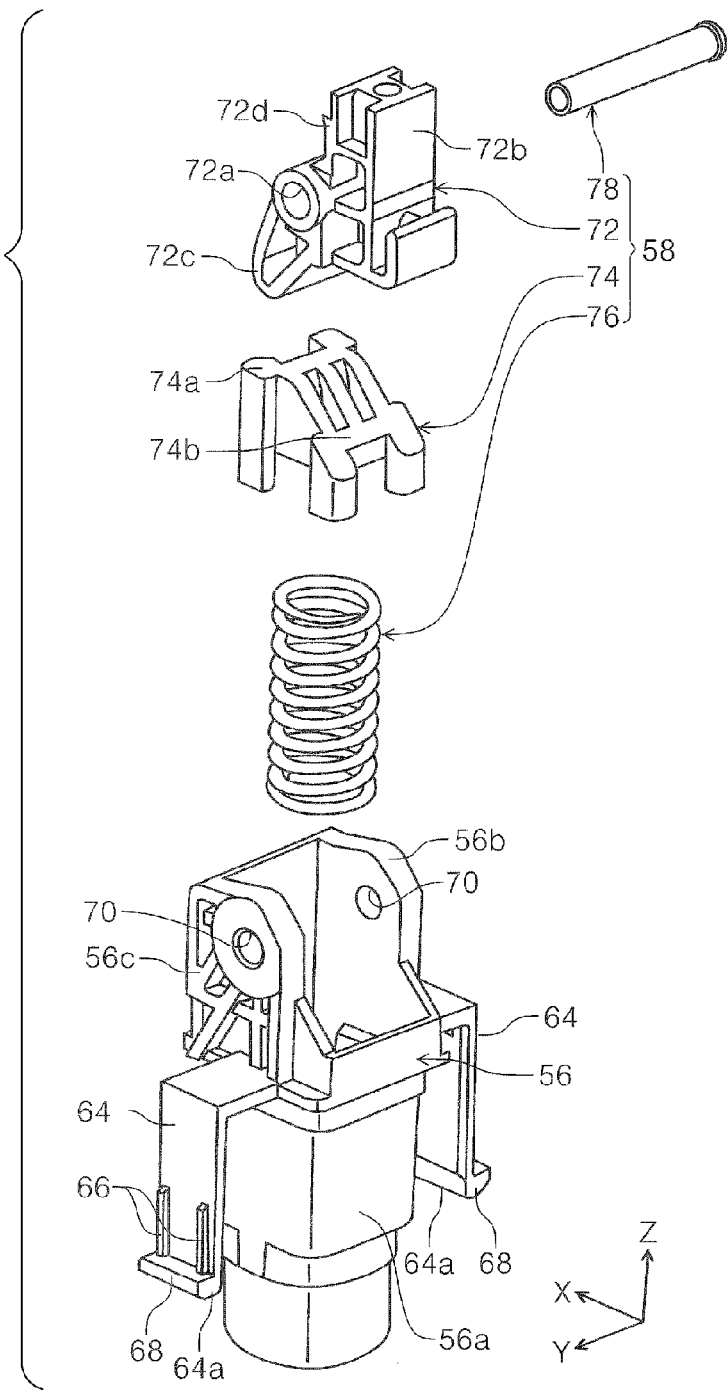
FIG. 7 is an exploded perspective view of the hinge unit according to the invention.

FIG. 1 is an external perspective view of an image scanning apparatus according to the invention. FIG. 2 is a front perspective view of the image scanning apparatus, with an auto document feeder (ADF) being in an open posture relative to a casing. FIG. 3 is a perspective view of the image scanning apparatus taken from a rear surface side, with the ADF being in an open posture relative to the casing. FIG. 4 is a perspective view of the image scanning apparatus, showing a state in which the ADF has been lifted up from the casing. FIG. 5 is a perspective view showing an internal structure of the casing of the image scanning apparatus according to the invention. FIG. 6 is a perspective view showing a hinge unit according to the invention. FIG. 7 is an exploded perspective view of the hinge unit according to the invention.

Figure 8:
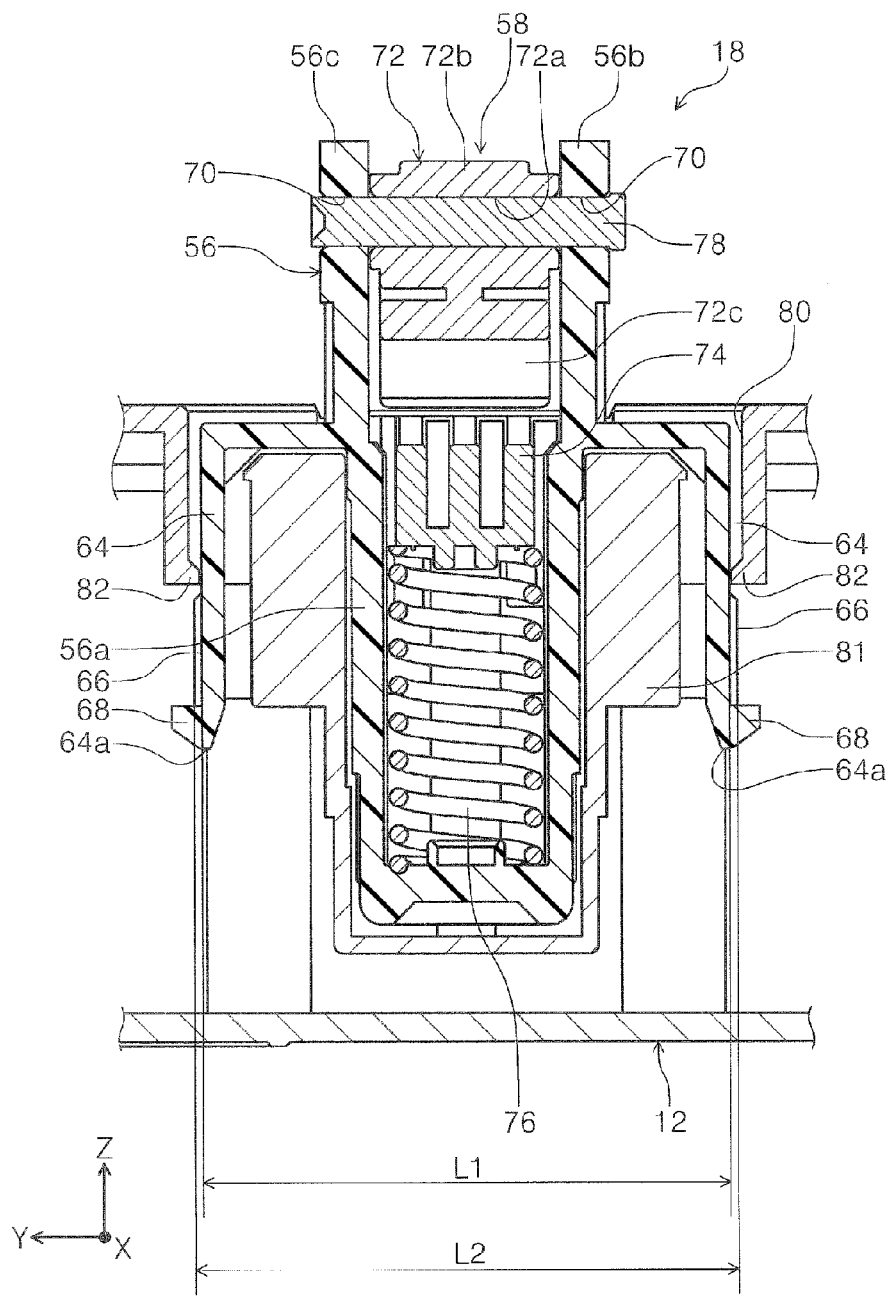
FIG. 8 is a sectional view showing a state of the hinge unit when the ADF is not lifted up from the casing.
Figure 9:
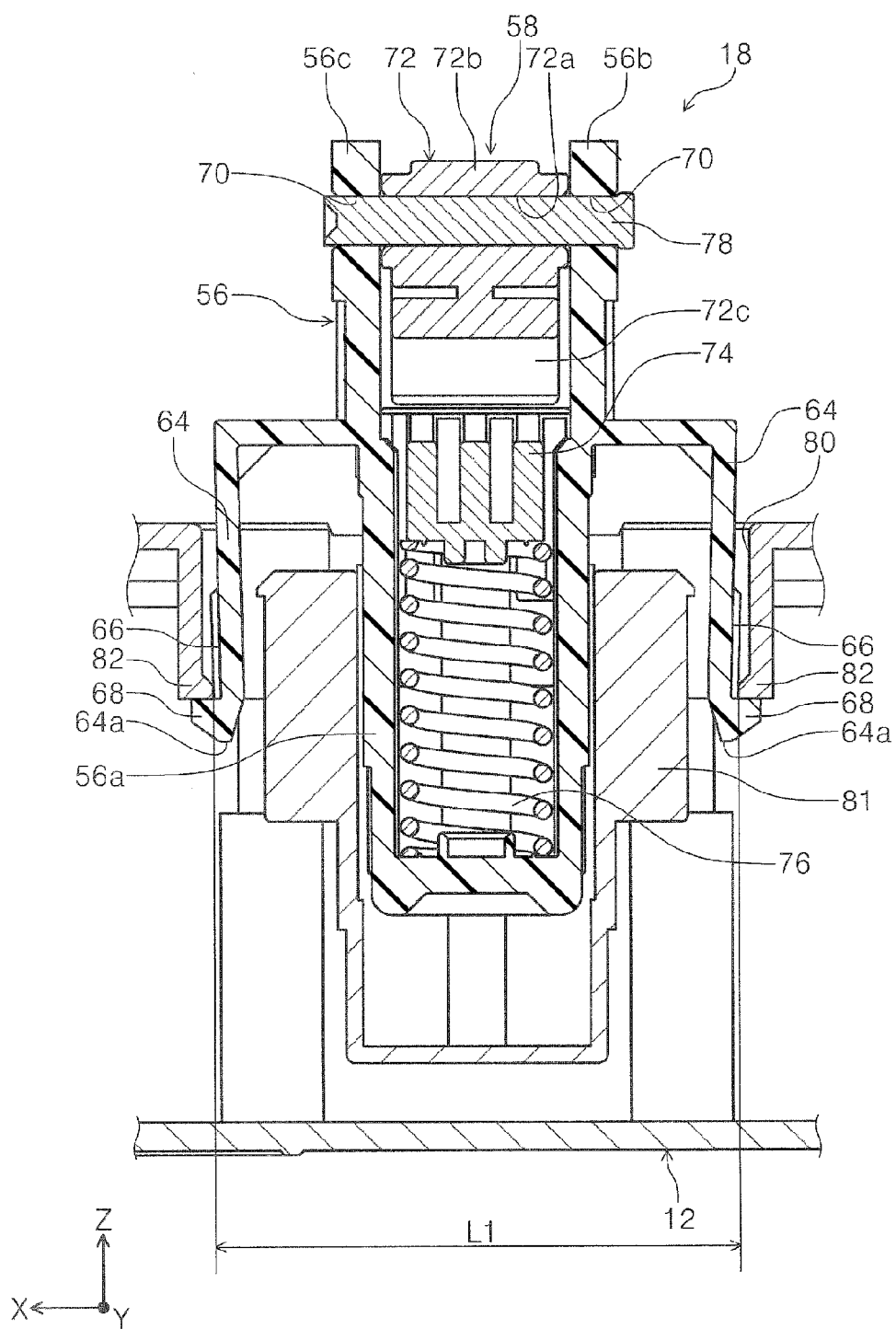
FIG. 9 is a sectional view showing a state of the hinge unit when the ADF has been lifted up from the casing.
Figure 10:
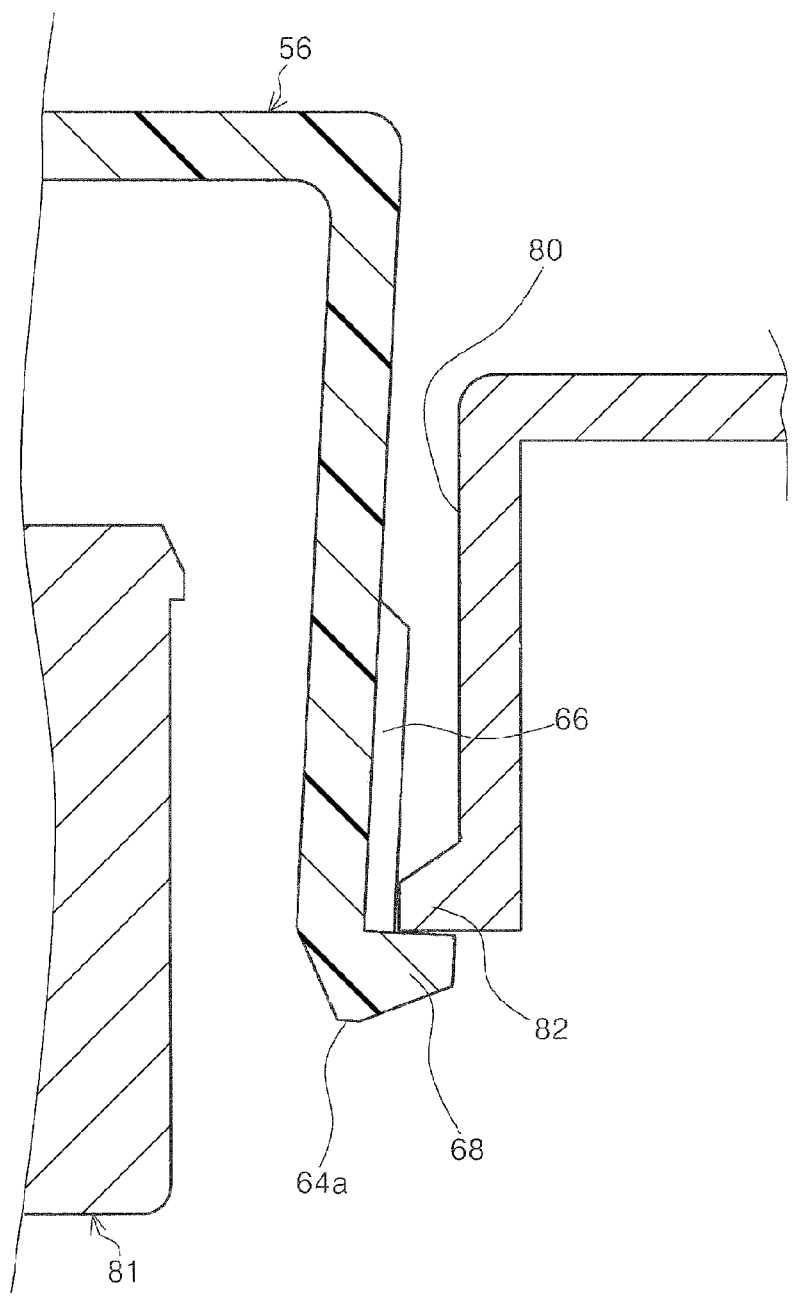
FIG. 10 is a sectional view of an arm portion of the hinge unit in the state shown in FIG. 9.
Figure 11:
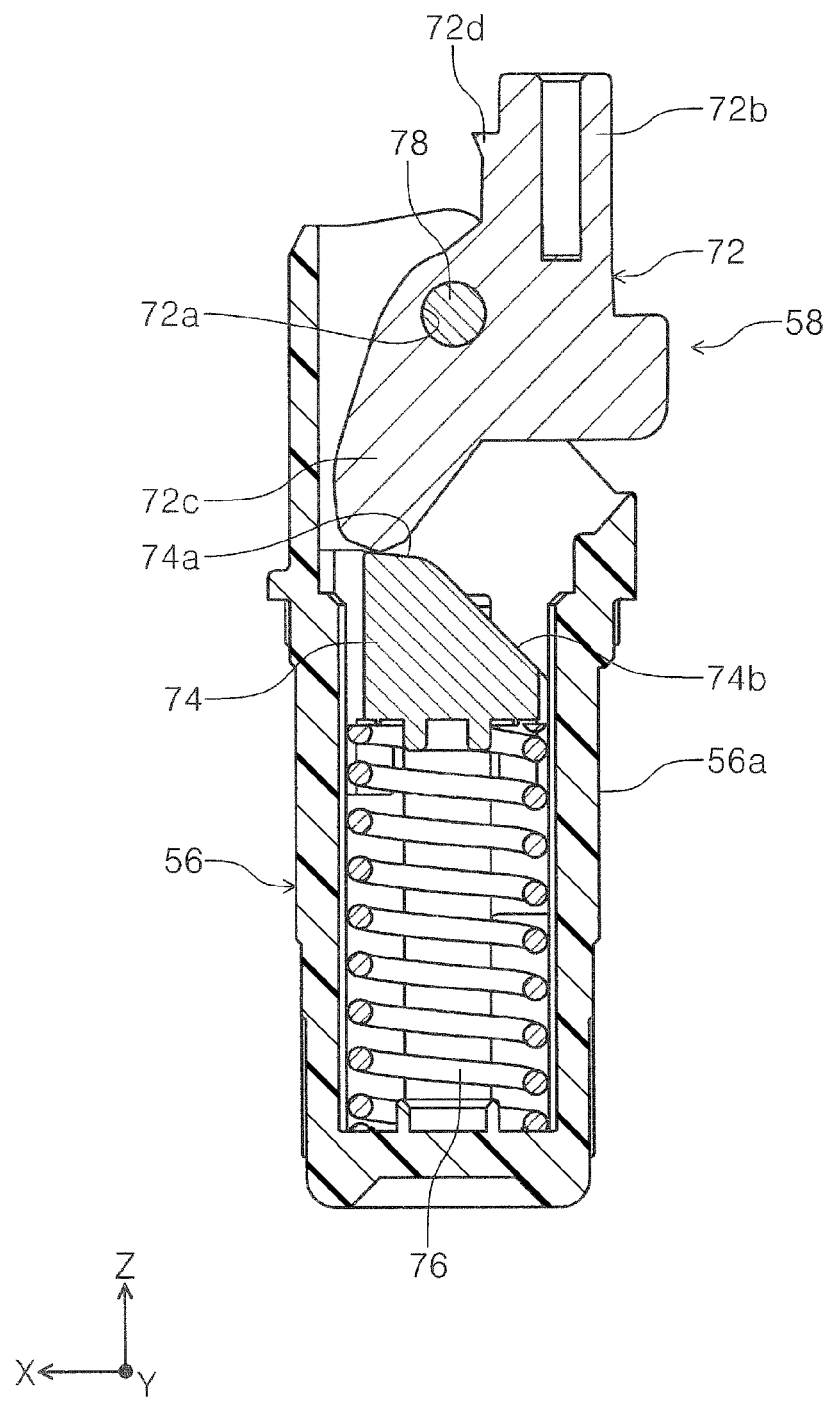
FIG. 11 is a side sectional view of an angle retainer in the hinge unit when the ADF is in a closed posture relative to the casing.
Figure 12:
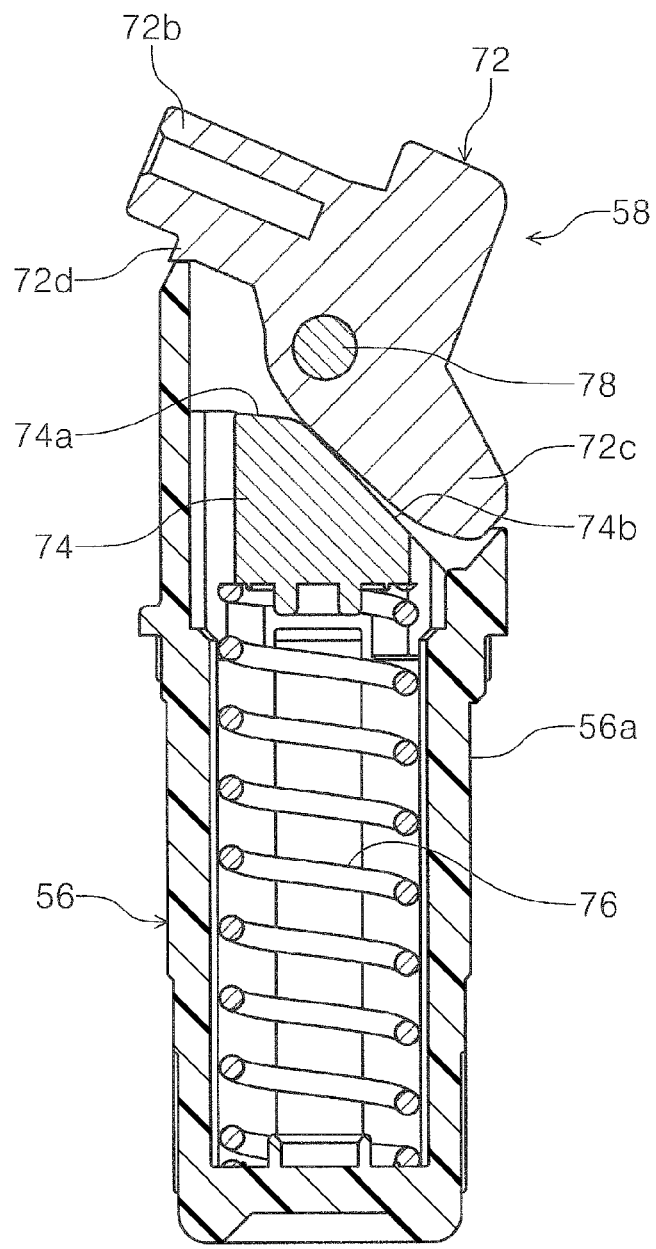
FIG. 12 is a side sectional view of the angle retainer in the hinge unit when the ADF is in an open posture relative to the casing.
Figure 13:
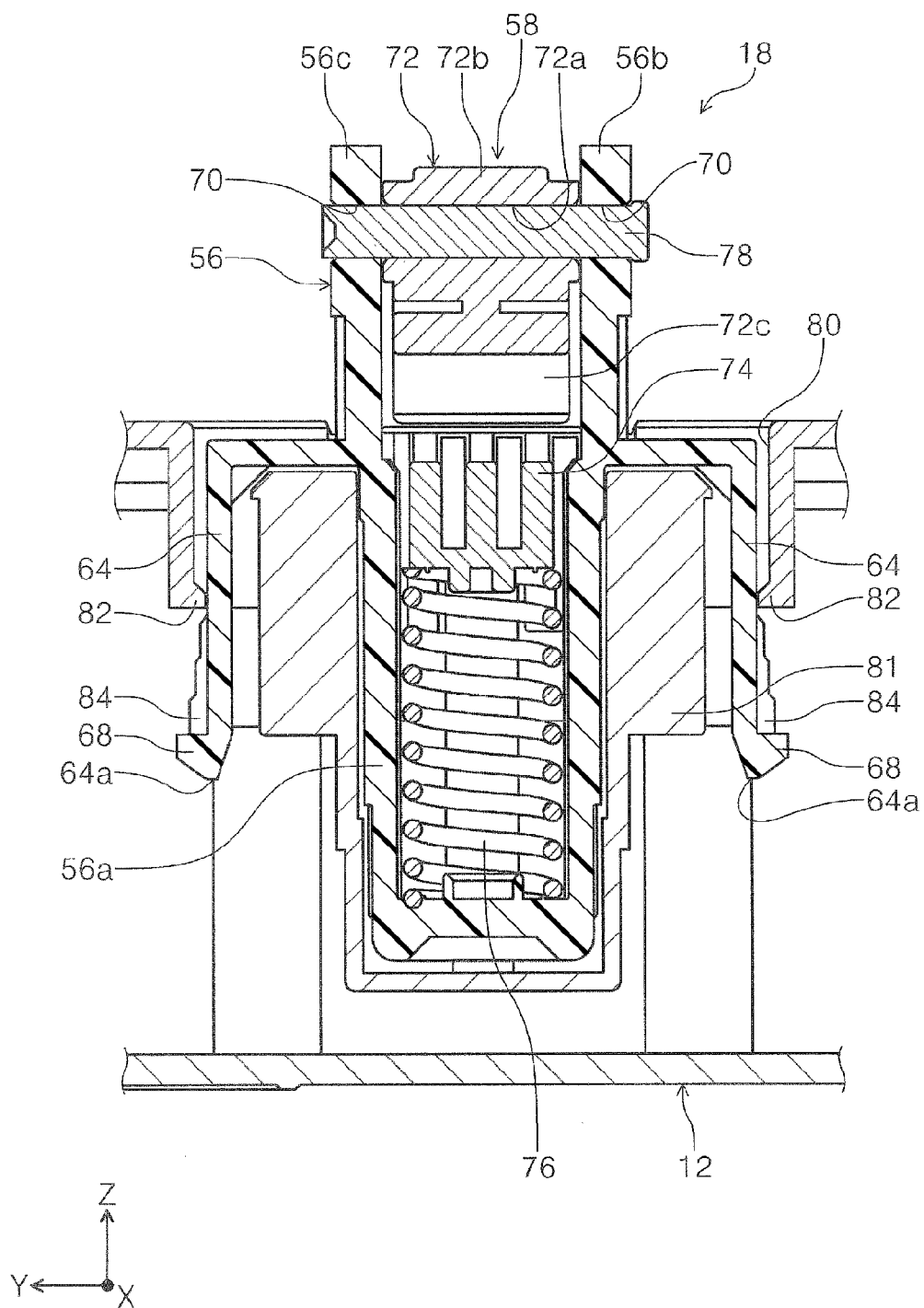
FIG. 13 is a sectional view showing a modified example of a hinge unit.

FIG. 8 is a sectional view showing a state of the hinge unit when the ADF is not lifted up from the casing. FIG. 9 is a sectional view showing a state of the hinge unit when the ADF has been lifted up from the casing. FIG. 10 is a sectional view of an arm portion of the hinge unit in the state shown in FIG. 9. FIG. 11 is a side sectional view of an angle retainer in the hinge unit when the ADF is in a closed posture relative to the casing. FIG. 12 is a side sectional view of the angle retainer in the hinge unit when the ADF is in an open posture relative to the casing. FIG. 13 is a sectional view showing a modified example of a hinge unit.

In an X-Y-Z coordinate system indicated in each of the drawings, X directions are main scanning directions of an image scanning unit and also apparatus depth directions, Y directions are subsidiary scanning directions and also apparatus width directions, and Z directions are apparatus height directions. In this specification, it is assumed that the positive X axis direction side is an apparatus rear surface side, the negative X axis direction side is an apparatus front surface side, the negative Y axis direction side is an apparatus width direction right side, and the positive Y axis direction side is an apparatus width direction left side.

Exemplary Embodiments

General Description of Image Scanning Apparatus

An image scanning apparatus 10 will be described with reference to FIGS. 1 to 4. The image scanning apparatus 10 includes a casing 12 and an auto document feeder (ADF) 14 (hereinafter, referred to as "ADF 14") that is a "cover body". The ADF 14 is constructed so as to be capable of being switched between a closed posture (see FIG. 1) relative to an upper surface 12*a* of a casing 12 and to a document table 22 and an open posture (see FIG. 2 and FIG. 3) in which the ADF 14 exposes the upper surface 12*a* and the document table 22. More concretely, the ADF 14 is swingably connected to the casing 12 via hinge units 18 and 19 that are provided as a "hinge mechanism" on an apparatus rear surface-side portion of the casing 12. That is, the ADF 14 is pivotable between the closed posture and the open posture relative to the casing 12, with its apparatus front surface-side end portion being a free end. The hinge units 18 and 19 will be later described in detail.

Furthermore, the hinge unit 18 allows the ADF 14 to be moved into and out of contact with (lifted up from and lifted down to) the document table 22 (described later) in apparatus height directions while remaining in a substantially horizontal posture (or in a tilted posture as well) relative to the document table 22, as shown in FIG. 4. This operation will be described later in conjunction with a detailed description of the hinge unit 18.

The casing 12 has an upper surface 12a and an operating unit 20 (see FIG. 2). In this exemplary embodiment, the upper surface 12a is provided with the document table 22. The document table 22 is made up of a flat and transparent glass plate and its upper surface serves as a document mounting surface 23. A document to be scanned can be mounted on the document table 22, specifically, on the document mounting surface 23.

Furthermore, in this exemplary embodiment, an end portion of the document table 22 in the negative Y direction has been set as a reference position in the apparatus width directions for a document scanning unit 24 (see FIG. 5) (which will be described as an example) to scan a document mounted on the document table 22. Note that a periphery around the document mounting surface 23, that is, the upper surface 12a, is higher than the document table 22 by a certain amount, so that a document can be positioned to a negative Y direction-side end portion of the document table 22 by placing a corner portion of the document in firm contact with an adjacent edge portion of the upper surface 12a.

Furthermore, an apparatus front surface side of the casing 12 (a negative X axis direction side thereof in FIG. 1 and FIG. 2) is provided with the operating unit 20. The operating unit 20 includes an electric power supply switch, a setting change button, etc., that are provided to operate the image scanning apparatus 10.

The ADF 14 includes a document holder member 26, a document supporting tray 28, a document transport unit 30, and a document discharge tray 32. The document transport unit 30 transports a document supported by the document supporting tray 28 when the ADF 14 is in the closed posture relative to the casing 12 (see FIG. 1), and discharges the document to the document discharge tray 32 after a scanning-object surface of the document is scanned on the document mounting surface 23 (see FIG. 2) provided on an upper portion of the casing 12 by a document scanning unit 24 (see FIG. 5) that is described later.

A lower surface of the ADF 14, that is, a surface thereof that faces the document table 22, is provided with the document holder member 26. The document holder member 26 is made up of, for example, an elastic material such as a sponge. When the ADF 14 is in the closed posture (see FIG. 1) relative to the document table 22, the document holder member 26 uniformly presses a document mounted on the document mounting surface 23 from the side opposite to the document mounting surface 23 so that the document does not slacken or rise from the document mounting surface 23. As the document is pressed against the document mounting surface 23 by the document holder member 26, the scanning-object surface of the document closely contacts the document mounting surface 23. Note that, in this exemplary embodiment, the size of the document holder member 26 is set such a size as to exert pressure over a region in the document mounting surface 23 which excludes the region where the document transported by the document transport unit 30 is scanned.

Construction Inside the Casing

With reference to FIG. 5, a construction inside the casing 12 will be described. The casing 12 includes, in addition to the document table 22, the document mounting surface 23, and the operating unit 20 described above, the document scanning unit 24, a document scanning unit driver 34, an electric power supply unit 36, and a control unit 38.

In this exemplary embodiment, the document scanning unit 24 extends in the apparatus depth directions, which are main scanning directions, and corresponds in size to a length of the document table 22 in the apparatus depth directions. In this exemplary embodiment, the document scanning unit 24 is provided as an optical unit that sends light to a document mounted on the document mounting surface 23 of the document table 22 and receives reflected light from the document to read information from the document.

The document scanning unit 24 is constructed to be capable of moving back and forth in the apparatus width directions, which are subsidiary scanning directions, by the document scanning unit driver 34. In a central region within the casing 12 in the apparatus depth directions there is provided a guide rail 40 that extends in the apparatus width directions and that engages with at least a portion of a lower portion of the document scanning unit 24.

The document scanning unit driver 34 includes a driving motor 42, a drive force transmission unit 44, a driving pulley 46, a driven pulley 48, and a toothed belt 50. At a least portion of the toothed belt 50 is held by the document scanning unit 24. As shown in FIG. 5, the driving pulley 46 is provided at a right side end in the apparatus width directions and the driven pulley 48 is provided at a left side end in the apparatus width direction so as to be capable of being moved according to rotation of the driving pulley 46. Furthermore, the toothed belt 50 is wrapped around the driving pulley 46 and the driven pulley 48.

The drive force transmission unit 44 includes a plurality of gears and transmits drive force from the driving motor 42 to the driving pulley 46. Therefore, the driving pulley 46 is rotationally driven and the toothed belt 50 rotates according to the rotation of the driving pulley 46. As a result, the document scanning unit 24 is driven in the apparatus width directions by the document scanning unit driver 34. Since at least a portion of the document scanning unit 24 is engaged with the guide rail 40, the document scanning unit 24 is guided by the guide rail 40 to move in the apparatus width directions.

In FIG. 5, the position of the document scanning unit 24 in the apparatus width directions corresponds to a reference position in the apparatus width directions which is set in order to scan the document mounted on the document mounting surface 23. Specifically, in FIG. 5, the document scanning unit 24 is positioned at an origin position to scan the document mounted on the document mounting surface 23 of the document table 22.

Furthermore, the control unit 38 is provided on the bottom surface 12b of the casing 12, more specifically, in a region to the apparatus rear surface side of the guide rail 40. The control unit 38 includes a circuit substrate that has a plurality of electronic component parts. The control unit 38 performs control of an image scanning operation of the image scanning apparatus 10, control of the ADF 14, the processing of inputs from the operating unit 20, and communication with external appliances. Connected to the control unit 38 are two signal transmission cables 52 and 54 that are flexible and that extend out from two opposite end portions of the document scanning unit 24 in the apparatus depth directions.

The signal transmission cables 52 and 54 are constructed so as to deform passively according to the movement action of the document scanning unit 24 in the apparatus width directions. In this exemplary embodiment, the signal transmission cable 52 transmits analog signals and the signal transmission cable 54 transmits digital signals.

In FIG. 5, the electric power supply unit 36 is disposed in a portion of the casing 12 which is at the apparatus rear surface side and at the right side end in the apparatus width directions. In this exemplary embodiment, the electric power supply unit 36 includes a rectifier circuit that converts alternating current supplied from an electric power supply cable (not graphically shown) into direct current.

Construction of Hinge Units

The hinge unit 18 will next be described with reference to FIG. 6 to FIG. 12. The hinge unit 19 will be described after description of the hinge unit 18. Note that FIGS. 8 and 9 omit illustration of the ADF 14 and FIGS. 11 and 12 omit illustration of the casing 12 and the ADF 14.

As shown in FIGS. 6 and 7, the hinge unit 18 includes a case 56 and an angle retainer 58. The case 56 has a box shape whose upper side portion in the apparatus height directions has an opening. The case 56 has a case body 56a that houses therein the angle retainer 58 and that also has arm portions 64 and 64 that have been formed integrally with the case body 56a.

The arm portions 64 and 64 extend out from the case 56 in the apparatus width directions and, from their distal ends in the apparatus width directions, extend downward in the apparatus height direction. In this exemplary embodiment, the case 56 has two arm portions 64 and 64 that are connected to two opposite sides of the case body 56a in the apparatus width directions. Each arm portion 64 has, on a portion extending in the apparatus height directions, ribs 66 and 66.

Each rib 66 provided on a portion of an arm portion 64 extending in the apparatus height directions is provided on a side surface of that portion which is opposite to the case body 56a of the case 56 and extends in the apparatus height directions. Furthermore, a lower end portion of the portion of each arm portion 64 extending in the apparatus height directions is constructed as a free end 64a. Therefore, when the free end 64a of an arm portion 64 receives a pressing force toward the case body 56a, the free end 64a of the arm portion 64 elastically deforms toward the case body 56a. Furthermore, the free end 64a of each arm portion 64 is provided with a restriction portion 68.

The case 56 is formed from, for example, a resin material such as polyoxymethylene (POM). In this exemplary embodiment, the arm portions 64 are formed integrally with the case 56 from a resin material.

On an upper portion of the case body 56a there are provided side wall portions 56b and 56c that are spaced from each other by an interval in the apparatus width directions and that face each other. The side wall portions 56b and 56c stand upward in the apparatus height direction. The side wall portions 56b and 56c each have a through hole 70 that extends in the apparatus width directions. The through hole 70 formed in the side wall portion 56b and the through hole 70 formed in the side wall portion 56c are coaxial with each other.

As shown in FIG. 7, the angle retainer 58 includes a cam member 72, a slider member 74, an urging member 76, and a pivot shaft 78. As shown in FIGS. 8 and 9, the urging member 76, the slider member 74, and the cam member 72 are disposed in that order from the lower side in the apparatus height direction within the case body 56a of the case 56. An end portion of the urging member 76 is engaged with a bottom surface inside the case body 56a and another end portion thereof engaged with the slider member 74. The urging member 76 urges the slider member 74 upward in the apparatus height direction.

The cam member 72 is provided with a through hole 72a that penetrates the cam member 72 in the apparatus width directions. The pivot shaft 78 is inserted, with its axis lying in the apparatus width directions, through the through hole 70 of the side wall portion 56b of the case 56, the through hole 72a of the cam member 72, and the through hole 70 of the side wall portion 56c of the case 56 in that order. That is, the cam member 72 is attached to the case 56 so as to be pivotable relative to the case 56 with the pivot shaft 78 serving as a fulcrum.

Furthermore, the cam member 72 includes an attachment portion 72b that is attached to at least a portion of an apparatus-depth-direction rear surface-side end portion of the ADF 14, a cam portion 72c that engages with the slider member 74, and a posture retainer portion 72d provided on an apparatus depth direction-facing rear surface side of the attachment portion 72b. An upper portion of the slider member 74 has a first contact surface 74a and a second contact surface 74b that are capable of engaging with the cam portion 72c.

In this exemplary embodiment, the first contact surface 74a is a surface that is inclined toward the front side in the apparatus depth directions and a lower side in the apparatus height directions. The second contact surface 74b is also a surface inclined toward the front side in the apparatus depth directions and the lower side in the apparatus height direction. In this this exemplary embodiment, the inclination angle of the second contact surface 74b is set greater than the inclination angle of the First contact surface 74a. In this exemplary embodiment, the surface that contacts the cam portion 72c switches between the first contact surface 74a and the second contact surface 74b according to the posture of the cam member 72.

In this exemplary embodiment, the construction of the hinge unit 19 is substantially the same as that of the hinge unit 18, except that unlike the hinge unit 18, the hinge unit 19 does not have the function of retaining the angle of the ADF 14. Concretely, the hinge unit 19, similar to the hinge unit 18, allows the ADF 14 to be pivoted and lifted upward and downward relative to the casing 12. That is, in this exemplary embodiment, a construction that produces a torque for retaining the opening angle of the ADF 14 is provided only on the hinge unit 18.

Lift Up/Down Operation of the Hinge Unit

Next, a lift up/down operation of the hinge unit 18 in the apparatus height directions will be described with reference to FIG. 8 to FIG. 10. As shown in FIG. 8, the hinge unit 18 of the case 56 is inserted into an insertion portion 80 that is formed in an end portion of the casing 12 at the apparatus depth direction-facing rear surface side. The case body 56a of the casing 12 is inserted in a receptacle portion 81 provided inside the insertion portion 80 so that the case body 56a is movable relative to the receptacle portion 81. Furthermore, the insertion portion 80 is provided with contact portions 82 and 82 that contact the arm portions 64. In this exemplary embodiment, the contact portions 82 and 82 face each other in the apparatus width directions. The distance between the contact portions 82 facing each other is set to a distance L1.

Furthermore, in this exemplary embodiment, the distance in the apparatus width directions between the ribs 66 and 66 provided on the two arm portions 64 and 64 during the state in which neither one of the arm portions 64 is elastically deformed is set to a distance L2. In this exemplary embodiment, the distance L2 is longer than the distance L1.

In FIG. 8, the contact portions 82 of the insertion portion 80 are in contact with the arm portions 64 of the case 56 at a position higher in the apparatus height directions than a position at which the ribs 66 are formed. In the state shown in FIG. 8, the case body 56*a* is at a lowermost position relative to the receptacle portion 81 of the insertion portion 80 in the apparatus height directions, which are the lift up/down directions of the case body 56*a* and therefore of the ADF 14. When the state shown in FIG. 8 is assumed, the ADF 14 covers the document table 22 as shown in FIG. 1.

Note that the ADF 14 is attached to the cam member 72 and that the cam member 72 is attached to the case body 56*a* via the pivot shaft 78. Therefore, when the ADF 14 is lifted upward in the apparatus height direction, the case body 56*a* is also lifted upward in the apparatus height direction. As a result, the case 56 is moved upward in the apparatus height direction relative to the insertion portion 80.

When the case 56 is displaced upward in the apparatus height direction relative to the insertion portion 80, the arm portions 64 are also displaced upward in the apparatus height direction. In this operation, the contact sites on the arm portions 64 which contact the contact portions 82 of the insertion portion 80 shift toward the free ends 64*a* of the arm portions 64.

In this exemplary embodiment, due to the relation of the distance L2>the distance L1, when the arm portions 64 are displaced upward in the apparatus height direction relative to the contact portions 82 so that the ribs 66 come into contact with the contact portions 82, the contact portions 82 press the ribs 66 and therefore the arm portions 64 toward the case body 56*a*. Therefore, free end 64*a*-side portions of the arm portions 64 elastically deform toward the case body 56*a* (see FIGS. 9 and 10).

In this exemplary embodiment, the arm portions 64 and 64 are elastically deformed toward the case body 56*a* by a length that corresponds to the difference between the distance L2 and the distance L1 in the apparatus width directions. Due to this, the arm portions 64 and 64 produce pressing forces that press the contact portions 82 and 82. Because these pressing forces press the free end 64*a*-side portions of the arm portions 64 against the contact portions 82, the arm portions 64 brace themselves, inside the insertion portion 80, against the contact portions 82 so as to retain the position of the case 56 and therefore the position of the ADF 14 in the apparatus height directions.

Furthermore, when the case 56 is displaced further upward in the apparatus height direction relative to the insertion portion 80, the contact portions 82 come into contact with the restriction portions 68 provided on the free ends 64*a* of the arm portions 64. In this exemplary embodiment, the size of the restriction portions 68 in the apparatus width directions is set so that, when the arm portions 64 are elastically deformed in the apparatus width directions, the distance between the restriction portions 68 and 68 provided on the two arm portions 64 and 64 is longer than the distance L1. That is, the restriction portions 68, when in contact with the contact portions 82, restrict the case 56 from moving upward in the apparatus height direction relative to the insertion portions 80. Therefore, the restriction portions 68 prevent the case 56 from slipping out of the insertion portion 80.

As described above, when the cases 56 are displaced upward in the apparatus height direction relative to the insertion portions 80, the ADF 14 is lifted from the state of covering the document table 22 (see FIG. 1) to an upper side in the apparatus height direction while retaining the posture relative to the document table 22 (see FIG. 4).

That is, in this exemplary embodiment, the ADF 14 can be moved upward and downward in the apparatus height directions by moving the cases 56 relative to the insertion portions 80. Furthermore, in this exemplary embodiment, the cam member 72 is pivotable via the pivot shaft 78 relative to the case body 56*a* even after the case 56 has been displaced upward in the apparatus height direction relative to the insertion portion 80. Therefore, the ADF 14 can be pivoted relative to the casing 12 even during a state in which the ADF 14 is apart from the document table 22.

Hence, for example, when the ADF 14 is closed after a thick document, for example, a booklet or a passport, has been mounted on the document mounting surface 23 with the ADF 14 assuming an open posture relative to the document mounting surface 23, the ADF 14 is lifted up and can maintain that lifted-up position. As a result, the ADF 14 can uniformly press the opposite side of the thick document to the scanning-object surface.

Note that, when the cases 56 and therefore the ADF 14 are pushed downward in the apparatus height direction, the contact sites on the arm portions 64 in contact with the contact portions 82 are displaced from the ribs 66 to an upper side in the apparatus height directions. Therefore, the cases 56 (the ADF 14) are displaced to the lowermost position in the apparatus height directions, which is the lift up/down directions of the cases 56 and therefore the ADF 14 relative to the insertion portions 80, so that the ADF 14 assumes a state of covering the document table 22 (see FIG. 1).

Retention of Opening Angle of ADF by Angle Retainer

The retention of the opening angle of the ADF 14 by the angle retainer 58 will be described with reference to FIG. 11 and FIG. 12. A state shown in FIG. 11 is a state assumed by the angle retainer 58 when the ADF 14 assumes a closed posture relative to the casing 12 (see FIG. 1). In this state, the cam portion 72*c* of the cam member 72 is engaged with the first contact surface 74*a* of the slider member 74. Since the slider member 74 is urged upward in the apparatus height direction by the urging member 76, the cam member 72 is also urged upward in the apparatus height direction by the urging member 76 via the slider member 74.

When the ADF 14 is pivoted toward the apparatus rear surface side with the hinge units 18 and 19 serving as fulcrums so as to change the state of the ADF 14 from the closed state relative to the casing 12 (see FIG. 1) to the open state relative to the casing 12 (see FIGS. 2 and 3), the cam portion 72*c* of the cam member 72 pivots counterclockwise in FIG. 11 about the pivot shaft 78.

As this action occurs, the cam portion 72*c* slides on the first contact surface 74*a* of the slider member 74 toward the second contact surface 74*b*. Then, as the opening angle of the ADF 14 further increases, the cam portion 72*c* comes into contact with the second contact surface 74*b* and then further slides on the second contact surface 74*b* to the front side in the apparatus depth directions.

During this action, since the urging member 76 urges the cam member 72 via the slider member 74, the urging force of the urging member 76 acts as an auxiliary force for opening the ADF 14. That is, the ADF 14 can be pivoted by exerting a force that is smaller than the weight of the ADF 14.

Then, when the ADF 14 is opened to a predetermined opening angle, the cam portion 72*c* assumes a state of being engaged with the second contact surface 74*b* as shown in FIG. 12. During this state, the urging force of the urging member 76 still urges the cam member 72 to pivot counterclockwise in FIG. 12.

However, because the posture retainer portion 72d of the cam member 72 becomes engaged with an upper portion of a rear surface-side end portion of the case body 56a, the posture retainer portion 72d restricts the cam member 72 from pivoting counterclockwise. Then, since, due to the urging force of the urging member 76, the posture retainer portion 72d presses the upper portion of the rear surface-side end portion of the case body 56a, the cam member 72 retains the posture shown in FIG. 12. That is, the angle retainer 58 retains the opening angle of the ADF 14 and retains the open posture of the ADF 14 relative to the document table 22 (see FIGS. 2 and 3).

Modifications of Exemplary Embodiment (1) Although in the exemplary embodiment, the ribs 66 extending on the arm portions 64 in the apparatus height directions have a uniform thickness in the apparatus width directions, the thickness of the ribs 66 of the arm portions 64 may increase toward the free end side. Concretely, a construction in which the thickness of the ribs 66 may continuously increase to the lower end side in the apparatus height directions may be adopted. Alternatively, it is also permissible to adopt a construction as shown in FIG. 13 in which the arm portions 64 are provided with stairs-shaped ribs 84 whose thickness increases stepwise toward the lower end side in the apparatus height directions. Such constructions make it possible to increase the number of positions at which to retain the ADF 14 when the ADF 14 is lifted up and therefore to adapt to an increased variety of thicknesses of documents. (2) Although in the exemplary embodiment, the arm portions 64 and 64 are on the two opposite sides of each case 56 in the apparatus width direction, this construction may be replaced by a construction in which only one of the two sides is provided with an arm portion 64. (3) Although in the exemplary embodiment, the arm portions 64 and 64 are provided on the two opposite sides of each case 56 in the apparatus width direction, this construction may be replaced by a construction in which at least one of a front side and a rear side of each case 56 in the apparatus width direction is provided with an arm portion 64.

(4) Although in the exemplary embodiment, the casing 12 is provided with one hinge unit 18 that has the angle retaining function and one hinge unit 19 that does not have the angle retaining function, this construction may be replaced by a construction in which at least two hinge units 18 having the angle retaining function are provided or a construction in which at least two hinge units 19 not having the angle retaining function are provided. (5) Although in the exemplary embodiment, the ADF 14 provided as a pivotable cover body is attached to the casing 12, this construction may be replaced by a construction in which a simple cover member is pivotably attached to the casing 12. (6) Although in the exemplary embodiment, the arm portions 64 are formed from a resin material integrally with the case bodies 56a, this construction may be replaced by a construction in which the arm portions 64 are formed separately from the case bodies 56a.

To recapitulate the foregoing description, the image scanning apparatus 10 includes the document table 22 that forms the document mounting surface 23 on which the document is mounted, the ADF 14 that covers and uncovers the document mounting surface 23 that is an upper surface of the document table 22, and the hinge unit 18 that includes the angle retainer 58 for holding the opening angle of the ADF 14 and that allows the ADF 14 to be lifted upward and downward relative to the document mounting surface 23.

The hinge unit 18 includes the case 56 that has therein the angle retainer 58 and that is inserted through the insertion portion 80 formed in the document table 22 so as to be displaceable in the apparatus height directions, which are the directions in which the ADF is lifted upward and downward. The case 56 has the arm portions 64 which extend in directions that include an apparatus height direction component and which are elastically deformable in the apparatus width directions that intersect the apparatus height directions. The arm portions 64 elastically contact the contact portions 82 provided in the insertion portion 80 so that the position of the ADF 14 in the apparatus height directions is retained.

According to the foregoing construction, the hinge unit 18 includes the case 56 and the case 56 includes the arm portions 64 which extend in directions that include an apparatus height direction component and which are elastically deformable in the apparatus width directions. Furthermore, the arm portions 64 elastically contact the contact portions 82 provided in the insertion portion 80 so that the position of the ADF 14 in the apparatus height directions is maintained. Therefore, a construction that retains the up/down position (lifted-up position) of the ADF 14 (the case 56) can be obtained with a simple structure and at low costs.

Furthermore, in the image scanning apparatus 10, each arm portion 64 is provided with the ribs 66 that are formed in directions that include an apparatus height direction component. The ribs 66 contact the contact portions 82 so that the arm portions 64 elastically deform. According to this construction, by adjusting the thickness of the ribs 66, the amount of elastic deformation of the arm portions 64 can be easily adjusted and, therefore, the retention force for retaining the ADF 14 (the case 56) in position can be easily adjusted.

As for each arm portion 64, the distal end is the free end 64a, and the site of contact with a corresponding one of the contact portions 82 shifts toward the free end 64a as the ADF 14 is displaced in the lift-up direction. The ribs 66 have such a shape that the thickness of the ribs 66 measured in the apparatus width directions at the sites of contact with the contact portions 82 increases as the ADF 14 is displaced in the lift-up direction.

As the ADF 14 is displaced in the lift-up direction (lifted up), the contact sites on the arm portions 64 which contact the contact portions 82 shift toward the free ends 64a of the arm portions 64, so that, in an ordinary construction, the elastic force that occurs when the arm portions 64 are in elastic contact with the contact portions 82 in an ordinary construction tends to become smaller and therefore the retention of the ADF 14 in position tends to become difficult. However, according to the foregoing construction, the ribs 66 have such a shape that the thickness of the ribs 66 in the apparatus width directions at the sites of contact with the contact portions 82 increases as the ADF 14 is displaced in the lift-up direction. Therefore, when the ADF 14 is displaced in the lift-up direction, an amount of elastic deformation of the arm portions 64 can be secured and, therefore, the ADF 14 can be certainly retained in position.

Furthermore, in the image scanning apparatus 10, each arm portion 64 is provided with the restriction portion 68 that restricts the case 56 from slipping out of the insertion portion 80. This construction prevents the unintentional detachment of the case 56 and therefore the ADF 14 from the document table 22.

Furthermore, in the image scanning apparatus 10, the ADF 14, when pivoted about the pivot shafts 78, covers or uncovers the document mounting surface 23 that is an upper surface of the document table 22. The arm portions 64 are provided on side portions of the case 56 which face in the axis directions of the pivot shaft 78 (the Y axis directions in this exemplary embodiment).

According to the foregoing construction, because the ADF 14, when pivoted about the pivot shafts 78, covers or uncovers the document mounting surface 23 that is an upper surface of the document table 22 and the arm portions 64 are provided on side portions of the case 56 which face in the axis directions of the pivot shaft 78 (the Y axis directions in this exemplary embodiment), the insertion portion 80 provided at the side of the document table 22, that is, in the casing 12, so as to accept insertion of the hinge unit 18 can be substantially prevented from increasing in size in the apparatus depth directions that are orthogonal to the axis direction (that are the X axis directions in this exemplary embodiment). As a result, the document table 22 can be substantially prevented from increasing in size in the apparatus depth directions.

Furthermore, in the image scanning apparatus 10, the arm portions 64 are provided on two opposite side portions of the case 56 in the axis directions of the pivot shafts 78. This construction substantially prevents the arm portions 64 from rotating relative to the insertion portions 80 and therefore substantially prevents the ADF 14 from becoming wobbly relative to the document table 22.

Furthermore, in the image scanning apparatus 10, the arm portions 64 are formed from a resin material integrally with the case 56. Due to this construction, the arm portions 64 and the case 56 can be provided at low costs.

It should be apparent that the invention is not limited to the foregoing exemplary embodiments or the like but can be modified in various manners within the scope of the invention described in the appended claims and that such modifications are encompassed within the scope of the invention.

The entire disclosure of Japanese Patent Application No. 2015-234906, filed Dec. 1, 2015 is expressly incorporated by reference herein.

What is claimed is:

1. An image scanning apparatus comprising:
   a document table having a document mounting surface on which a document is mounted;
   a cover body that covers and uncovers the upper surface of the document table; and
   a hinge mechanism which has an angle retainer that retains an opening angle of the cover body and which allows the cover body to be lifted up and down relative to the document mounting surface,
   wherein the hinge mechanism includes a case that is inserted into an insertion portion provided in the document table so that the case is displaceable in lift up/down directions of the cover body, and
   wherein the case includes an arm portion which extends in a direction that includes a lift up/down direction component and which is elastically deformable in a direction that intersects the lift up/down directions, and
   wherein the arm portion elastically contacts a contact portion provided in the insertion portion so that the cover body is retained in position in the lift up/down directions, wherein the arm portion extends outwardly from a side of the case so as to be able to be inserted into the insertion portion and contact the contact portion.

2. The image scanning apparatus according to claim 1,
   wherein the arm portion is provided with a rib formed in a direction that includes a lift up/down direction component, and
   wherein the rib contacts the contact portion so that the arm portion elastically deforms.

3. The image scanning apparatus according to claim 2,
   wherein a distal end of the arm portion is a free end, and a site on the arm portion which contacts the contact portion shifts toward the free end as the cover body is displaced in a lift-up direction, and
   wherein the rib has such a shape that a thickness of the rib at the site that contacts the contact portion in a direction that intersects the lift up/down directions increases as the cover body is displaced in the lift-up direction.

4. The image scanning apparatus according to claim 1, wherein the arm portion is provided with a restriction portion that restricts the case from slipping out of the insertion portion.

5. The image scanning apparatus according to claim 1,
   wherein the cover body covers and uncovers the upper surface of the document table by pivoting about a pivot shaft, and
   wherein the arm portion is provided on a side portion of the case which faces in an axis direction of the pivot shaft.

6. The image scanning apparatus according to claim 5, wherein the arm portion is provided on each of two opposite side portions of the case which face in axis directions of the pivot shaft.

7. The image scanning apparatus according to claim 1, wherein each arm portion is formed from a resin material integrally with the case.

* * * * *